United States Patent
Shiokawa et al.

[11] Patent Number: 5,865,703
[45] Date of Patent: Feb. 2, 1999

[54] MULTI-STAGE TRANSMISSION

[76] Inventors: Hiroyasu Shiokawa, 9-3, Sone-Nishimachi 4-Chome; Shozo Shiokawa, 3-8-203, Minami-Sakurazuka 1-Chome, both of Toyonaka City, Prefecture Osaka 561, Japan

[21] Appl. No.: 800,292

[22] Filed: Feb. 13, 1997

[30] Foreign Application Priority Data

Sep. 19, 1996 [JP] Japan .................................. 8-271681

[51] Int. Cl.⁶ .................................................. F16H 15/08
[52] U.S. Cl. ........................... 475/269; 475/290; 475/293
[58] Field of Search .................................... 475/269, 271, 475/290, 293, 286, 207, 219

[56] References Cited

U.S. PATENT DOCUMENTS

| | | | |
|---|---|---|---|
| 707,672 | 8/1902 | Baker | 475/290 |
| 1,405,237 | 1/1922 | Linden et al. | 475/290 |
| 1,808,539 | 6/1931 | Gessner | 475/290 |
| 2,759,374 | 8/1956 | Bowman et al. | 475/269 X |
| 4,621,541 | 11/1986 | Takahashi | 475/290 X |
| 4,627,310 | 12/1986 | Coburn | 475/271 X |
| 4,658,673 | 4/1987 | Nerstad et al. | 475/290 |
| 5,123,884 | 6/1992 | Kondoh et al. | |
| 5,385,514 | 1/1995 | Dawe | |
| 5,397,281 | 3/1995 | Forster | |

FOREIGN PATENT DOCUMENTS 6-18748  3/1994  Japan .

*Primary Examiner*—Dirk Wright
*Assistant Examiner*—Peter T. Kwon
*Attorney, Agent, or Firm*—Wenderoth, Lind & Ponack, L.L.P.

[57] ABSTRACT

Multi-stage change of speed between an input shaft and an output shaft on the same axis in a casing is achieved by planetary gear systems provided in multi-stages on the same axis in the casing. Sun gears 4 of plural groups of the planetary gear systems, having different velocity ratios, are fixed to one shaft. Carriers of each group of the planetary gear systems are connected to the other shaft to rotate as one body. A braking device can brake an internal gear of each group of the planetary gear systems individually, thus causing only the planetary gear system of a desired velocity ratio to perform transmission of rotation.

14 Claims, 8 Drawing Sheets

MULTI-STAGE TRANSMISSION

BACKGROUND OF THE INVENTION

The present invention is related to a multi-stage transmission provided with plural planetary gear systems having different rotation ratios on the same axis in multi-stage. The invention enables interruption of transmission of rotation of an input shaft to an output shaft provided on the same axis, through one of a group of planetary gear systems having a prescribed speed change ratio.

Transmission by a planetary gear system has been widely used because it can produce a larger velocity ratio than transmission by other gear types. The conventional transmission of this type is designed, for example as disclosed in Japanese utility model application No. Hei. 6-18748, to fix an internal gear and to obtain a fixed velocity ratio through carriers arranged in multi-stage and a pinion gear and a sun gear.

In the case of forming a single multi-stage transmission by a gear transmitting system of a non-planetary gear type, there are such disadvantages as the body of the machine becomes large, the weight of the machine increases and the machine has inferior shock enduring capacity and wear resisting capacity. According to the conventional planetary gear system, it is possible to obtain a large speed change ratio on the same axis and to make the size of the machine compact, but there is the disadvantage that multi-stage change of speed is impossible.

For this reason, it has been a problem to produce a multi-stage transmission which has shock enduring capacity and a wear resisting capacity and which enables multi-stage changes of speed while utilizing the advantages of the planetary gear system and avoiding increasing the size of the machine body.

SUMMARY OF THE INVENTION

The present invention provides a multi-stage transmission wherein outer surface of plural internal gears are supported along the inner surface of a cylindrical casing in such way as they respectively rotate freely on the same axis. A sun gear of each planetary gear system is connected to a rotary shaft extending into the axis of the casing to rotate with the shaft as one body. Plural carriers are arranged on the rotary shaft in a rotation-free state and are placed on opposite sides of a pinion of each system. The carriers on the circumference of the sun gear are linked with each other so that they rotate as one body by the carriers supporting opposite ends of a pinion shaft of the pinion. Another rotary shaft is connected to an outermost carrier in a rotation-free state. Plural braking devices are arranged on the circumference of the casing and engage circumferences of respective internal gears. A prescribed rotation ratio is produced between one rotary shaft and the other rotary shaft, both provided on the same axis, transmits rotation through rotation of the sun gear of the corresponding group and revolution of the pinion and rotation of all carriers as one body, by actuating one of the braking devices to brake one group of the planetary gear systems having a desired rotation transmitting ratio, and by making the internal gear of the corresponding group stand still.

One of the braking devices arranged on the circumference of the casing is actuated to cause the internal gear of the corresponding planetary gear system to stop. The pinion of the corresponding group revolves by linking with the rotation of the sun gear of the corresponding group. Thus, a prescribed ratio of rotating speed is produced between one rotary shaft having the sun gear and the other rotary shaft connected to the carrier through the rotation as one body of all carriers connected to each other by the pinion shaft.

The planetary gear systems provided in multi-stages inside the casing have different velocity ratios and operate separately by optional use of the respective braking devices. Thereby, it is possible to produce multi-stage changes of speed between two shafts placed on the same axis.

Thus, according to the present invention containing the planetary gear systems of different velocity ratios in multi-stages, it is possible to make the body of the machine compact in size and to produce a multi-stage transmission having superior durability.

In the transmission of the present invention, one rotary shaft can be composed of a primary rotary shaft supported at one end of the casing and a secondary rotary shaft position ahead of the primary rotary shaft on the same axis and provided at its inner end as one body with the sun gear of each group of the planetary gear systems in multi-stages. The primary and secondary rotary shafts are used as an input shaft while the other rotary shaft is used as an output shaft. A clutch is provided between the primary and the secondary rotary shafts so as to optionally interrupt transmission of rotation of the input shaft to the output shaft. Thus, it is possible to optionally brake the output shaft only while keeping the input shaft rotating.

In the transmission of the present invention, the input shaft is composed of the primary rotary shaft and the secondary rotary shaft as mentioned above. The clutch positioned therebetween contains planetary gear systems which, apart from the groups of the planetary gear systems for changing velocity, are composed of a respective sun gear provided on the primary rotary shaft as one body, a pinion engaging with the sun gear, carriers supporting a pinion shaft of the pinion and connected to the secondary rotary shaft in such way as to rotate as one body, and an internal gear provided along the inner surface of the casing in a rotation-free state. By operation of the planetary gear systems and the braking device arranged on the circumference of the casing so as to engage with the internal gear to make the internal gear stand still, it is possible to optionally brake the output shaft only while keeping the input shaft rotating. Thereby, it is also possible to make assembly of the machine easier and to produce a multi-stage transmission on high durability and high accuracy of actuation.

Further, in the transmission of the present invention, the rotary shaft to become the output shaft can be composed of a primary rotary shaft supported on the other end of the casing and a secondary rotary shaft positioned at the inner end of the primary rotary shaft on the same axis and connected at its inner end to a carrier rotate with the carrier as one body. At a connecting position of the primary and the secondary rotary shafts is arranged a retainer which has a pinion projected from its inner surface and which rotates freely. A pair of bevel gears engage with each other with the pinion therebetween. One of the bevel gears is fixed to the secondary rotary shaft while the other is mounted on the primary rotary shaft in a slide-free state. A ring member which can slide in the axial direction inside the casing is provided at the position close to the retainer and adjacent to the outer surface of the bevel gear mounted on the primary rotary shaft. Plural connecting pins have ends supported on the inner surface of the ring member, have their axes extending parallel to the primary and secondary rotary shafts, and are spaced in the circumferential direction. A forward rotation transmitting state is formed for transmitting rotation of the secondary rotary shaft to the primary rotary shaft through said retainer, the pair of bevel gears and the pinion by positioning the connecting pins, which through the bevel gear of the primary rotary shaft, to extend into the bevel bear of the secondary rotary shaft, and by connecting said two bevel gears to each other in such way that they rotate together. A braking device brakes the rotation of the retainer by contacting the circumference of the retainer from the circumference of the casing. A cylindrical member is positioned with the ring member in a slide-free state inside the casing. A fluid pressure device is connected to the cylindrical member. The retainer is caused to stand still by actuating the fluid pressure device and the braking device. The ring member slides to enable the connecting pins to retract from the bevel gear of the secondary rotary shaft. A reverse rotation transmitting state is formed for reversing the transmission of the rotation of the primary and the secondary rotary shafts through the transmission of rotation of the two bevel gears and the pinion.

By such arrangement, it is possible to change the direction of rotation between the input and output shafts, thereby to utilize the invention with a device that requires reverse operation, such as an automobile.

DETAILED DESCRIPTION OF THE INVENTION

Figure 1:
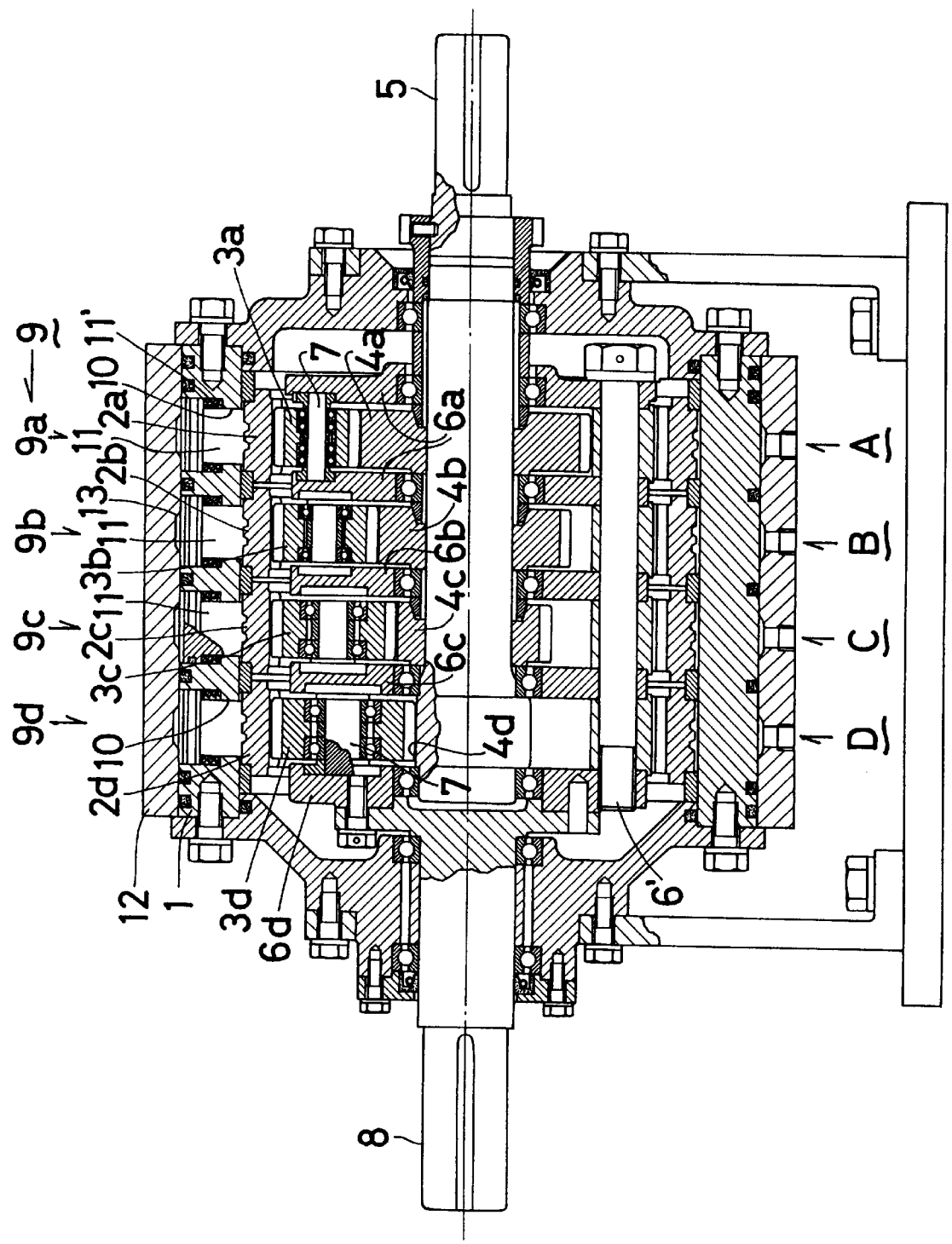
FIG. 1 is a longitudinally sectioned view of an embodiment of the invention.

An embodiment of the invention is shown in FIG. 1 and includes a casing 1 having a cylindrical inner surface. Four internal gears 2a, 2b, 2c, 2d are supported at respective outer surfaces thereof by the inner surface of the casing 1 in a rotation-free state, and are arranged on the same axis at appropriate intervals from each other.

The internal gears 2a, 2b, 2c, 2d are of the same diameter and constitute planetary gear systems A, B, C, D of four stages having different velocity ratios from each other by engagement of pinions 3a, 3b, 3c, 3d that are of different diameters with sun gears 4a, 4b, 4c, 4d of different diameters. Velocity ratios may be determined according to the present apparatus by employing different diameters for the internal gears of the respective planetary gear systems.

The sun gears 4a, 4b, 4c, 4d are fixed at respective inner surfaces thereof to rotary shaft 5 inserted from the right end of the casing 1, as shown in FIG. 1, to define the axis. The sun gears are fixed to shaft 5 and they rotate together therewith as one body.

Carriers 6a, 6b, 6c, 6d are mounted about rotary shaft 5 in a rotation-free state. Respective carriers are arranged on opposite sides of respective pinions 3a, 3b, 3c, 3d, and support opposite ends of respective pinion shafts 7 thereof. A connecting shaft 6' extends horizontally at a position not having pinion and connects the carriers to each other so as to rotate together as one body with rotation of the pinions.

Another rotary shaft 8 is inserted from the left end of the casing 1, as shown in FIG. 1, into the center of the axis and is supported its inner end in a rotation-free state. Shaft 8 is connected to the outermost carrier 6d and rotates as one body therewith upon rotation of the carrier.

A braking assembly 9 arranged on the outer surface of the casing 1 and, in the case of need to change speed, is designed to brake one internal gear having a prescribed velocity ration of the internal gears of the groups of the planetary gear systems A, B, C, D, thereby to decrease the speed of rotation of the sun gear of the corresponding group through the respective pinion 3 and the respective carrier 6 of the corresponding group. This produces a velocity ratio prescribed to the corresponding planetary gear system between rotary shaft 5 and rotary shaft 8.

In the working embodiment shown in FIG. 1, the braking assembly 9 is composed of four groups of braking devices 9a, 9b, 9c, 9d respectively corresponding to the internal gears 2a, 2b, 2c, 2d of the groups of planetary gear systems A, B, C, D. Each braking device includes a piston 11 which is positioned, together with a rotation spring 11', into a recess or hole 10 arranged at plural places in the circumferential direction of the casing 1 and which is pressed on the circumference of the respective internal gear. A circular groove 13 is formed on the inner surface of an outer cylinder 12 in such way as to correspond to the position of arrangement of the piston 11. Further, a fluid pressure device (illustration omitted) supplies/discharges pressure fluid to/from the circular groove 13 for moving the piston 11 inwardly or outwardly. The four groups of the braking devices 9a, 9b, 9c, 9d are designed to switch over optionally a desired planetary gear system from among A, B, C, D to an actuating condition by means of controlling their actuation by a controller (illustration omitted) attached to the fluid pressure device.

Figure 2:
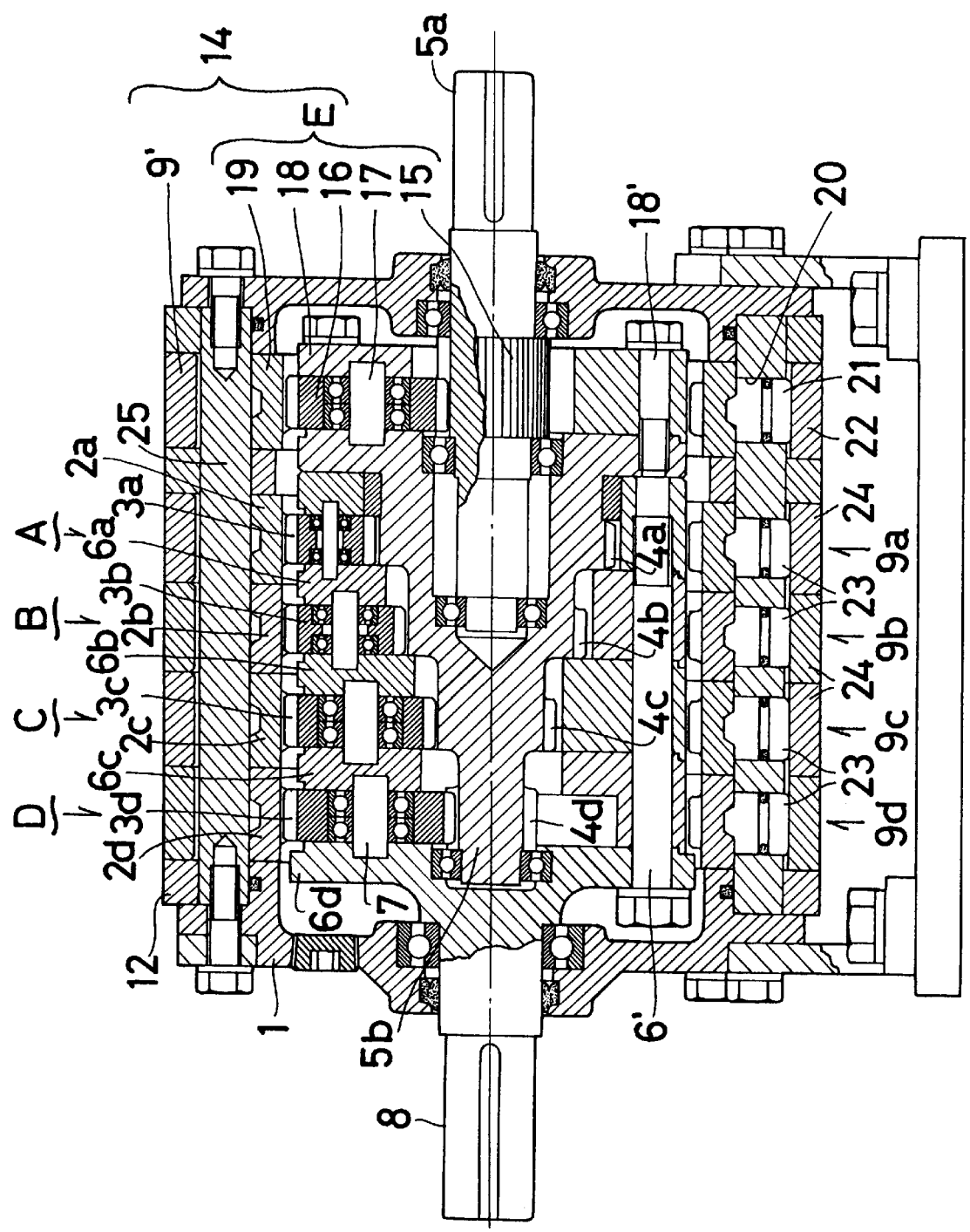
FIG. 2 is a longitudinally sectional view of another embodiment of the invention.

The embodiment shown in FIG. 2 has a braking assembly 9' including braking devices of the band brake type used in place of the braking devices of the fluid pressure type employed in the embodiment of FIG. 1. Also in this embodiment, rotary shaft 5 is composed of primary rotary shaft 5a supported on the right end of the casing 1 and secondary rotary shaft 5b positioned inwardly of the primary rotary shaft 5a on the same axis. Shaft 5b supports the sun gears 4a, 4b, 4c, 4d of the groups of the planetary gear systems A, B, C, D as one body in multi-stages. A clutch 14 is provided between the primary rotary shaft 5a and the secondary rotary shaft 5b.

In this embodiment, the primary rotary shaft 5a and secondary rotary shaft 5b form an input shaft and the rotary shaft 8 is an output shaft. By actuating clutch 14 provided between the primary and secondary rotary shafts 5a, 5b, it is possible to interrupt transmission of rotation of the input shaft 5a to output shaft 8. Also, it is possible to optionally brake or drive the output shaft 8 only while maintaining the input shaft 5a rotating.

The clutch 14 includes a planetary gear system (E) which, similar to the groups of the planetary gear systems A, B, C, D, is composed of a sun gear 15 formed as one body on the primary rotary shaft 5a and a pinion 16 arranged to engage with sun gear 15. A left-and-right pair of carriers 18 support a pinion shaft 17 of pinion 16 and are connected with each other by a connecting shaft 18'. Carriers 18 thus rotate together with the secondary rotary shaft 5b as one body. Internal gear 19 is provided along the inner surface of the casing 1 in a rotation-free state. A braking device 9' is composed of brake shoes 21 positioned in a number of recesses or holes 20 arranged at position corresponding to position of the planetary gear system (E) in the cylindrical direction of the casing 1. Shoes 21 press the outer surface of the internal gear 19. Band brake 22 presses brake shoe 21 from outside of the casing 1.

Figure 3:
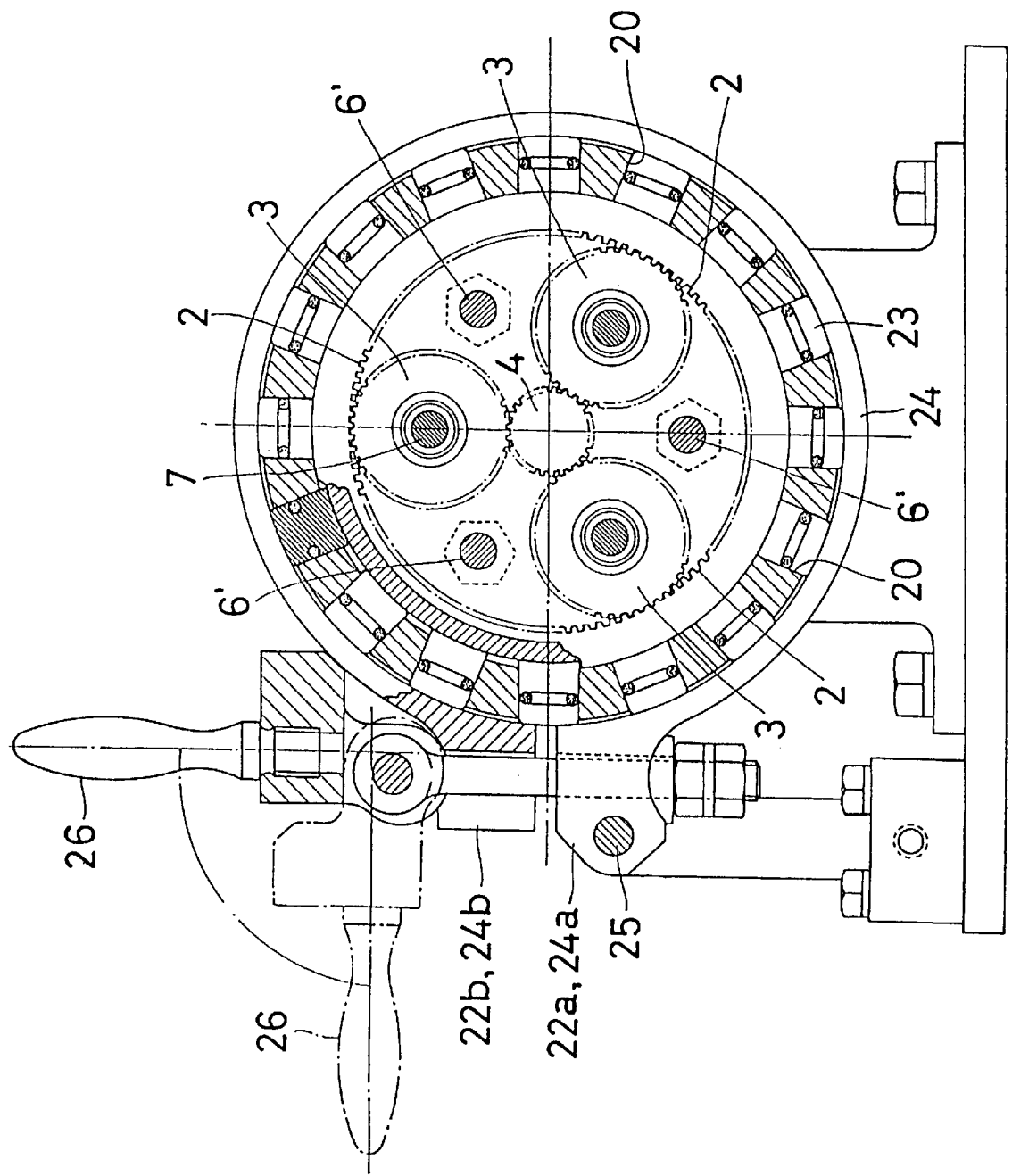
FIG. 3 is a partially sectioned front view of the embodiment of FIG. 2.
Figure 4:
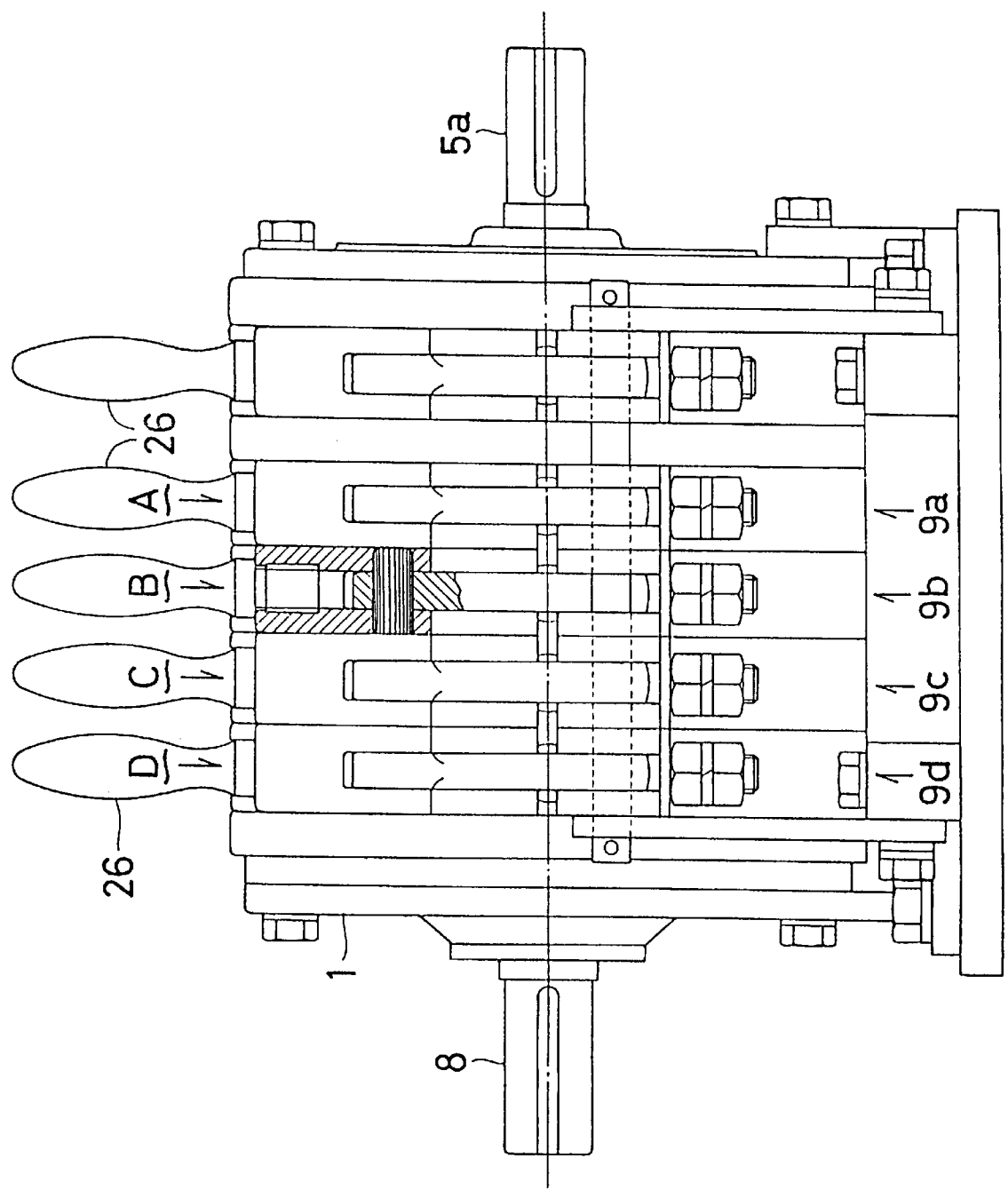
FIG. 4 is a side elevational view of the embodiment of FIG. 2.

A respective braking device 9' of the band brake type is associated with each group of the planetary gear systems A, B, C, D formed in multi-stages inside the casing 1 and includes respective brake shoes 23 in respective holes 20 arranged in the circumferential direction of the casing 1 for engaging with respective internal gears 2a, 2b, 2c, 2d of each group and band brakes 24 attached along the outer surface of the casing 1. The band brakes 24 as well as band brake 22 of clutch 14 are designed such that bases 22a and 24a thereof are hinged on a supporting shaft 25 extending parallel to the axis at a position along the circumference of the casing 1, as shown in FIGS. 2 and 3. Band brakes 22 and 24 are tightened by turning outwardly a lever handle 26 passed through ends 22b and 24b of band brakes 22 and 24 that extend around the internal gear 19 and the internal gears 2a, 2b, 2c, 2d, respectively. Thus, the internal gears of the corresponding group of the planetary gear systems A, B, C, D or the internal gear 19 are braked.

The clutch 14 works in such way that, when the band brake 22 is in non-actuated position, the primary rotary shaft 5a idles only, and, when the band brake 22 is switched over to an actuated position, the planetary gear system (E) composed of the sun gear 15, the pinion 16, the carrier 18 and the internal gear 19 is actuated, and thereby the primary rotary shaft 5a and the secondary rotary shaft 5b are switched over to a combined state.

In the embodiment of FIG. 2, members common to those of the embodiment of FIG. 1 are indicated by common reference numerals and detailed explanation thereof is omitted.

Figure 5:
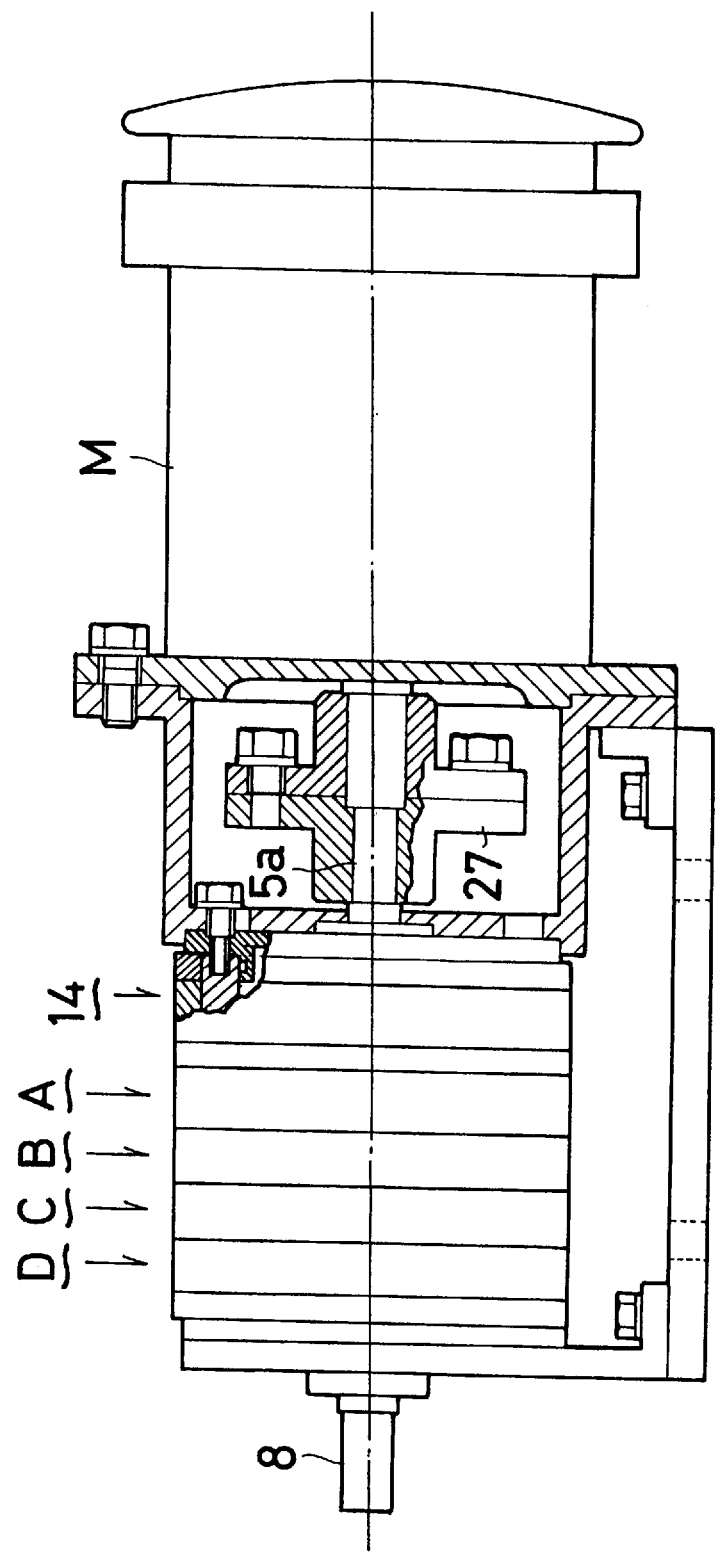
FIG. 5 is a partially sectioned side view of a further embodiment of a multi-stage transmission of the present invention.

The embodiment of FIG. 2 provided with the clutch 14 makes it possible to manufacture an electric motor of small size and high speed-reduction ratio by employing either the above-mentioned braking device 9' of band brake type or the braking device of the fluid pressure type as shown in the embodiment of FIG. 1, and by connecting the multi-stage transmission directly to the output shaft of a motor (M), for example through a coupler 27 as shown in FIG. 5.

Figure 6:
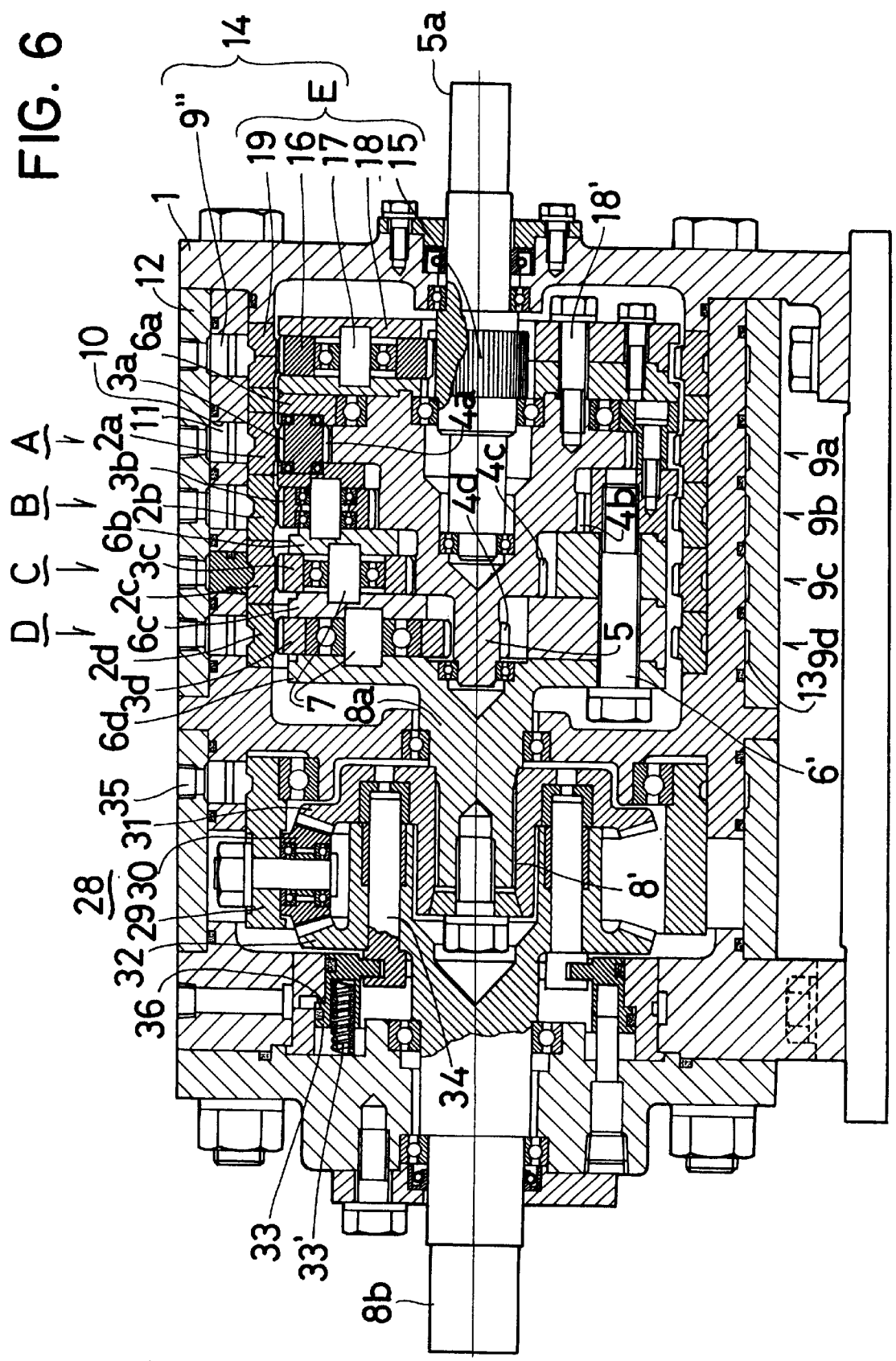
FIG. 6 is a longitudinally sectioned view of the embodiment of FIG. 5.

A further embodiment of the invention, shown in FIGS. 6 and 7, now will be explained.

This embodiment employs rotary shaft 5 of the embodiment of FIG. 1, which employs a braking device of the fluid pressure type, with the primary rotary shaft 5a and the secondary rotary shaft 5b in the same way as in the embodiment of FIG. 2, and arranges the clutch 14 including the planetary gear system (E) between the two rotary shafts. This embodiment also employs a braking device 9" of the fluid pressure type in place of the braking device of the band brake type for actuating the clutch 14, and further attaches a reversing device 28 to the transmission.

Figure 7:
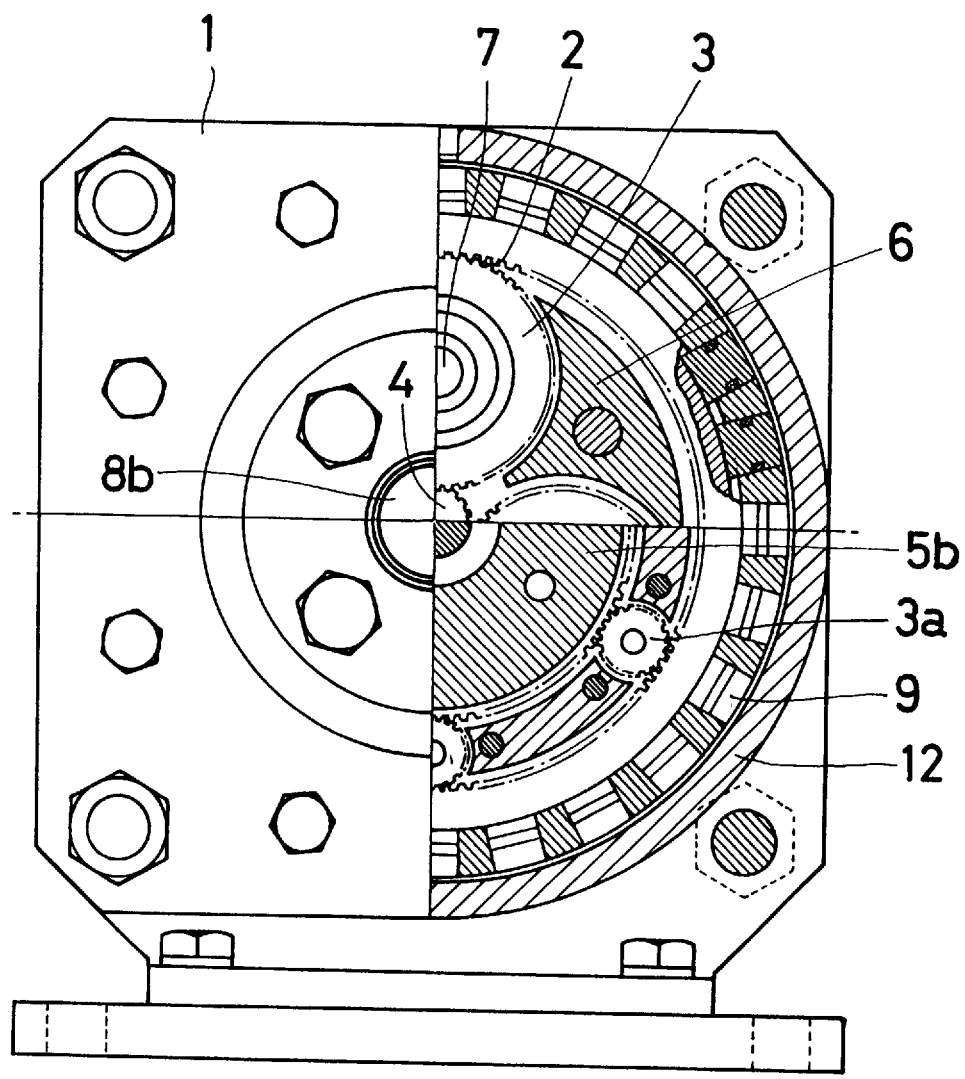
FIG. 7 is a partially sectioned front view of the embodiment of FIG. 5.

The rotary shaft 8 of the embodiment of FIG. 7 is composed of a primary rotary shaft 8a having an inner end connected to each of the carriers so as to rotate together as one body and a secondary rotary shaft 8b provided on an outer end of the primary rotary shaft 8a on the same axis and support on the left end of the casing 1 in a rotation-free state. Rotary shafts 5a and 5b at the right end of the casing 1 form an input shaft and rotary shafts 8a and 8b form an output shaft. The reversing device 28 is provided between the two rotary shafts 8a and 8b.

The reversing device 28 includes a retainer 29 arranged at a position of connection of the primary and the secondary rotary shafts 8a and 8b in a rotation-free state, and a pinion 30 supported by the retainer 29 in a rotation-free state and projected inwardly. A pair of bevel gears 31, 32 engage each other inside the retainer 29 and interpose the pinion 30 between them. The bevel gear 31 is fixed onto the primary rotary shaft 8a, while the bevel gear 32 is connected to the secondary rotary shaft 8b through a serration coupling 8' in such way as to rotate together with the shaft as one body. At the connecting position of the two rotary shafts 8a, 8b is a slide ring 33 which is movable along the axis in the casing 1 while being pressed with force by a restoration spring 33'. Ring 33 is at a position near the retainer 29 and adjacent to the left end of the bevel gear 32 on the secondary rotary shaft 8b. The sliding ring 33 is provided in the circumferential direction of its inner surface with plural connecting pins 34 having bases supported by ring 33 axes extending parallel to primary and secondary rotary shafts 8a, 8b. Each connecting pin 34 passes laterally through by the bevel gear 32 of the secondary rotary shaft 8b into the bevel gear 31 of the primary rotary shaft 8a. Pins 34 thus connect the two bevel gears 31, 32 to rotate together.

The above-mentioned retainer 29, the pair of bevel gears 31, 32 and the pinion 30 form a proper rotation transmitting device for transmitting rotation of the secondary rotary shaft 8b to the primary rotary shaft 8a.

Arranged on the circumference of the retainer 29 is a braking device 35 which engages from the circumference of the casing 1 with retainer 29 for braking rotation thereof. A cylindrical member 36 sets slide ring 33 inside the casing 1 in a slide-free state. A fluid pressure device (illustration omitted) has an inner end connected to cylindrical member 36. This arrangement forms a reverse rotation transmitting device for reversing the transmission of rotation of the primary and the secondary rotary shafts 8a, 8b through the transmission of rotation of the two bevel gears 31, 32 and the pinion 30 by means of moving the slide ring 33 by actuating the fluid pressure device and by causing connecting pins 34 to retract from the bevel gear 31 of the primary rotary shaft 8a.

In this embodiment, members that are common to the embodiments of FIGS. 1 and 2 are indicated by common reference numerals and detailed explanation thereof is omitted.

It is possible to apply the present invention extensively to rotation transmitting devices requiring reversion as well as multi-stage change of speed, such as a marine transmission or an automobile transmission, if the clutch 14 and the reversing device 28 are employed. This enables multi-stage changes of speed with the multi-stage planetary gear systems A, B, C, D.

Figure 8:
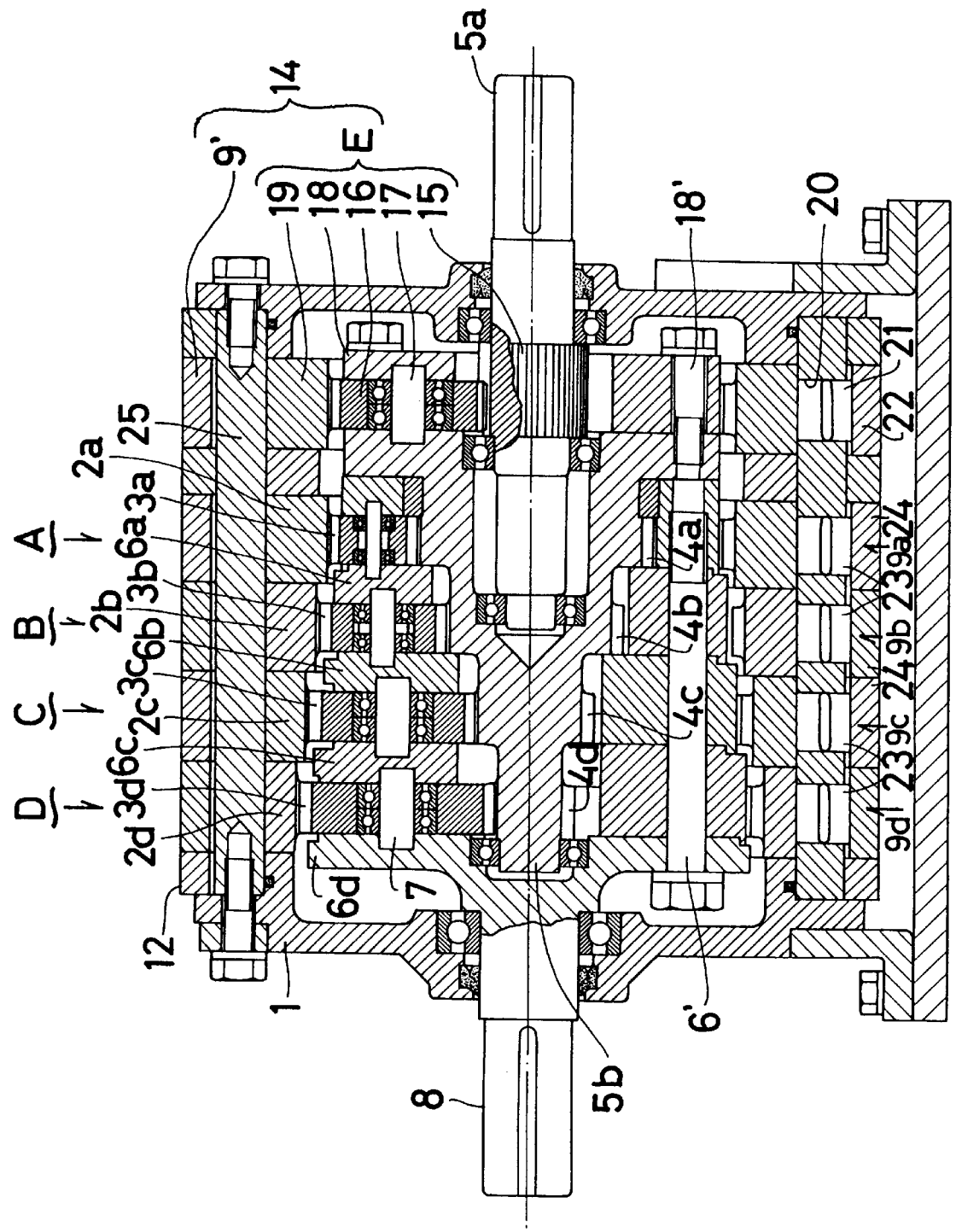
FIG. 8 is a partially sectioned front view of yet another embodiment of the invention.

A further embodiment of the invention shown in FIG. 8 now will be explained.

This embodiment employs four-stage planetary gear systems A, B, C, D having different velocity ratios by engaging pinions 3a, 3b, 3c, 3d having different diameters and sun gears 4a, 4b, 4c, 4d having different diameters with internal gears 2a, 2b, 2c, 2d of each stage having different diameters. Each of the internal gears 2a, 2b, 2c, 3d is provided with a respective braking device of the band brake type constructed in the same way as in the embodiment of FIG. 2, thus enabling optional selection of the planetary gear system having a desired velocity ratio. One rotary shaft is composed of primary rotary shaft 5a and secondary rotary shaft 5b and is the input shaft, while rotary shaft 8 is the output shaft. The clutch 14 is provided between the primary and the secondary rotary shafts 5a, 5b and is actuated so as to selectively interrupt transmission of rotation of input shaft 5a to output shaft 8. Thereby it is possible to optionally brake the output shaft 8 only while maintaining the input shaft 5a rotating and to change the velocity ratio.

As in the embodiment of FIG. 2, clutch 14 is composed of the planetary gear system (E), which is formed with the sun gear 15 provided as one body on the primary rotary shaft 5a, the pinion 16 engaging with sun gear 15, the left-and-right pair of carriers 18 supporting the pinion shaft 17 of the pinion 16 and connected with each other by the connecting shaft 18' so as to rotate together with the secondary rotary shaft 5b as one body, and the internal gear 19 arranged to rotate freely along the inner surface of the casing 1. Braking device 9' includes brake shoe 21 contacting the outer surface of the internal gear 19 and the band brake 22 pressing brake shoe 21.

In this embodiment, members common to those in the previous embodiments are indicated by common reference numerals and detailed explanation thereof is omitted.

The present invention which provides multi-stage planetary gear systems and the braking device for braking the internal gear of each group of the planetary gear systems. This enables multi-stage changes of speed between two rotary shafts provided on the same axis. It is possible to make the body of the machine compact in size and to produce a multi-stage transmission that is small in size, has a high speed reduction ratio and has excellent durability.

We claim:

1. A multi-stage transmission comprising:
   a cylindrical casing having an axis;
   a first shaft extending into said casing from a first end thereof, and a second shaft extending into said casing from a second end thereof, said first and second shafts being coaxial with said axis;
   a plurality of planetary gear systems spaced along said axis within said casing and having respective different velocity ratios, each said planetary gear system including:
      an internal gear freely rotatable within said casing coaxial with said axis;
      a sun gear coaxial with said axis and fixed to said first shaft to rotate therewith; and
      a pinion between said internal gear and said sun gear;
   a plurality of carriers coaxial to said axis and freely rotatably mounted about said first shaft, said carriers being positioned such that each said pinion is positioned axially between a pair of axially adjacent carriers, and each said pinion having a pinion shaft having opposite ends supported by said respective pair of axially adjacent carriers, such that said carriers are rotatable together;
   said second shaft having an inner end integral with an outermost said carrier closest to said second end of said casing; and
   a braking assembly for producing a prescribed rotation ratio between one said shaft and the other said shaft, said braking assembly comprising a plurality of braking devices positioned to selectively stop rotation of said internal gears of respective said planetary gear systems, whereby when a selected said braking device acts on a corresponding said internal gear of a said planetary gear system having said rotation ratio to stop rotation of said corresponding internal gear, rotation of said one shaft is transmitted through said sun gear of said respective planetary gear system, revolution of said pinion thereof and rotation of all of said carriers to said other shaft.

2. A multi-stage transmission as claimed in claim 1, wherein said one shaft comprises said first shaft.

3. A multi-stage transmission as claimed in claim 1, wherein each said braking device comprises a plurality of fluid operated members operable to be pressed against said corresponding internal gear.

4. A multi-stage transmission as claimed in claim 1, wherein each said braking device comprises a band brake and brake shoes operable by said band brake to be pressed against said corresponding internal gear.

5. A multi-stage transmission as claimed in claim 1, wherein said first shaft comprises a primary rotary shaft supported at said first end of said casing and a secondary rotary shaft coaxial of said primary rotary shaft and positioned inwardly of said casing relative thereto, said primary and secondary rotary shafts comprise an input shaft, and said second shaft comprises an output shaft.

6. A multi-stage transmission as claimed in claim 5, further comprising a clutch between said primary and secondary rotary shafts and operable to enable selective interruption of transmission of rotation of said input shaft to said output shaft.

7. A multi-stage transmission as claimed in claim 6, wherein said clutch comprises a further planetary gear system including a further internal gear freely rotatable within said casing coaxial with said axis, a further sun gear coaxial with said axis and integral with said primary rotary shaft to rotate therewith, a further pinion between said further internal gear and said further sun gear, a further carrier supporting a pinion shaft of said further pinion and integral with said secondary rotary shaft to rotate therewith, and a further braking device positioned to selectively stop rotation of said further internal gear.

8. A multi-stage transmission as claimed in claim 7, wherein said further braking device comprises a plurality of fluid operated members operable to be pressed against said further internal gear.

9. A multi-stage transmission as claimed in claim 1, wherein said second shaft comprises a primary rotary shaft supported at said second end of said casing and a secondary rotary shaft coaxial of said primary rotary shaft and positioned inwardly of said casing relative thereto, said secondary rotary shaft having said inner end of said second shaft that is integral with said outermost carrier.

10. A multi-stage transmission as claimed in claim 9, further comprising a retainer located at a position of connection between said primary and secondary rotary shafts, said retainer including an inwardly protruding, freely rotatable pinion and a pair of bevel gears positioned with said pinion therebetween, a first said bevel gear being fixed to said secondary rotary shaft, and a second of said bevel gears being mounted on said primary rotary shaft.

11. A multi-stage transmission as claimed in claim 10, further comprising a ring member mounted in said casing at a position adjacent said retainer and said second bevel gear for axial sliding movement, plural connecting pins mounted on said ring member and extending therefrom in directions parallel to said primary and secondary rotary shafts toward said secondary rotary shaft, and a cylindrical member slidable with said ring member within said casing.

12. A multi-stage transmission as claimed in claim 11, further comprising means to move said connecting pins toward said first bevel gear such that said connecting pins engage said first bevel gear, and means to move said connecting pins away from said first bevel gear and to withdraw said connecting pins from said first bevel gear.

13. A multi-stage transmission as claimed in claim 12, further comprising a retainer braking device for braking rotation of said retainer by pressing thereagainst.

14. A multi-stage transmission as claimed in claim 13, wherein said transmission is operable in a forward rotation mode by moving said connecting pins toward and into engagement with said first bevel gear and by not operating said retainer braking device, whereby rotation of said secondary rotary shaft is transmitted to said primary rotary shaft through said retainer, said pair of bevel gears and said pinion, and said transmission is operable in a reverse rotation mode by moving said connecting pins away from and withdrawing said connecting pins from said first bevel gear and by operating said retainer braking device to stop rotation of said retainer, whereby rotation of said secondary rotary shaft imparts reverse rotation to said primary rotary shaft through said pair of bevel gears and said pinion.

* * * * *